US008306800B2

(12) United States Patent
Mangalam et al.

(10) Patent No.: US 8,306,800 B2
(45) Date of Patent: Nov. 6, 2012

(54) METHOD FOR PREDICTING FLOW AND PERFORMANCE CHARACTERISTICS OF A BODY USING CRITICAL POINT LOCATION

(75) Inventors: Siva M. Mangalam, Williamsburg, VA (US); Arun Mangalam, Williamsburg, VA (US)

(73) Assignee: Tao of Systems Integration, Inc., Hampton, VA (US)

( * ) Notice: Subject to any disclaimer, the term of this patent is extended or adjusted under 35 U.S.C. 154(b) by 562 days.

(21) Appl. No.: 12/499,324

(22) Filed: Jul. 8, 2009

(65) Prior Publication Data
US 2010/0036648 A1    Feb. 11, 2010

Related U.S. Application Data

(60) Provisional application No. 61/078,943, filed on Jul. 8, 2008.

(51) Int. Cl.
*G06G 7/48* (2006.01)
(52) U.S. Cl. .......................................................... 703/9
(58) Field of Classification Search .................... 703/9
See application file for complete search history.

(56) References Cited

OTHER PUBLICATIONS

E.L. Houghton et al., "Aerodynamics for Engineering Students," fifth edition, 2003, Butterworth-Heinemann, pp. 1-207.*
L.C. Woods, "The theory of subsonic plane flow," 1961, Cambridge University Press, pp. xix, 18, 22, 23, 301, 323, 342, 343, 426-453.*
Luiz Augusto Tavares de Vargas et al., "Comparison between modern procedures for aerodynamic calculation of subsonic airfoils for application in light aircraft designs," 2005, Proceedings of the COBEM, 18th International Congress of Mechanical Engineering, eight unnumbered pages.*
Tuncer Cebeci et al., "An interactive boundary-layer method for multielement airfoils," 1998, Computers & Fluids, vol. 27, No. 5-6, pp. 651-661.*
A. Krumbein, "Transition Modeling in FLOWer-Transition Prescription and Prediction," 2005, in MEGAFLOW—Numerical Flow Simulation for Aircraft Design, by Norbert Kroll et al., Springer-Verlag, pp. 45-62.*
John M. Klineberg et al., "Calculation of separated flows at subsonic and transonic speed," 1973, Proceedings of the third international conference on numerical methods in fluid mechanics, vol. 19, Springer, pp. 161-168.*
T. Theodorsen et al., "General potential theory of arbitrary wing sections," 1933, NACA Report 452, pp. 177-209.*
M.I. Gurevich, "The theory of jets in an ideal fluid," 1966, Pergamon Press, pp. 1-36, 65-124.*
Joseph Katz et al., "Low-Speed Aerodynamics," second edition, 2001, Cambridge University Press, pp. 448-535.*
International Search Report, PCT Application No. PCT/US09/049914, dated Aug. 31, 2009, 7 pages.
AeroFoil Engineering (Software Version 2.1), Dec. 24, 2007; retrieved from Internet Aug. 5, 2009 (url: http://aerofoilengineering.com/Tour.htm).
Mangalam et al., "Real-Time Unsteady Loads Measurements Using Hot-Film Sensors," AIAA-2004-5371, 2004.

* cited by examiner

*Primary Examiner* — Kandasamy Thangavelu
*Assistant Examiner* — Russ Guill
(74) *Attorney, Agent, or Firm* — Hunton & Williams LLP (57) ABSTRACT

A method is provided for calculating flow performance characteristics of a body immersed in a fluid under a set of fluid flow conditions. The method comprises providing a geometrical description of a surface of the body and determining the set of fluid flow conditions. The set of fluid flow conditions includes a combination selected from the combination set consisting of angle of attack and leading edge stagnation point location, angle of attack and flow separation point location, and leading edge stagnation point location and flow separation point location. The method further comprises calculating a velocity flow field for the body using a critical point potential flow methodology and calculating flow performance characteristics.

2 Claims, 7 Drawing Sheets

METHOD FOR PREDICTING FLOW AND PERFORMANCE CHARACTERISTICS OF A BODY USING CRITICAL POINT LOCATION

CROSS-REFERENCE TO RELATED APPLICATIONS

This application claims priority to U.S. Provisional Application No. 61/078,943, filed Jul. 8, 2008, which is incorporated herein by reference in its entirety.

FIELD OF THE INVENTION

The invention relates generally to performance prediction and design of structures immersed in a fluid regime. More particularly, the invention relates to a method of modeling aerodynamic forces and moments that makes use of measured or predicted locations of flow bifurcation points.

BACKGROUND OF THE INVENTION

Current design programs use two main methods to achieve the desired aerodynamic characteristics for the airfoil. In the direct method, an iterative procedure is used to successively modify the shape of an airfoil until the desired aerodynamic characteristics are achieved. In the inverse method, the desired aerodynamic characteristics are specified and the airfoil shape that meets these objectives is determined.

The set of governing equations used to solve the problem is generally a simplified version of the full Navier-Stokes equations (see Kuethe, A. M. and Chow, C. Y.: Foundations of Aerodynamics, John Wiley & Sons (1998)), which require large computer power and computing time even for simple cases. The Euler equation is obtained when the fluid viscosity is neglected, and the Laplace equation results when the flow is assumed to be irrotational. In the interest of simplicity and in order to reduce the demands on computational resources and time, most airfoil design and analysis methods use either the Euler or Laplace equations. The velocity and pressure fields are determined by solving these equations. The aerodynamic forces and moments are then related to the pressure distribution around the airfoil.

In order to solve the problem for given free-stream conditions, it is necessary to prescribe the boundary conditions at the fluid-structure interface on the airfoil surface. They are usually specified either in terms of the flow direction tangential to the airfoil surface (the "Dirichlet condition") or in terms of the normal derivatives of the flow at the airfoil surface (the "Neumann condition"). See Woods, L. C.: The Theory of Subsonic Plane Flow, Cambridge University Press, (1961) ("Woods Reference"). A unique solution is usually obtained by imposing the condition that (1) the flow leaves the trailing edge smoothly and (2) the velocity is zero or finite at the trailing edge. See Katz, J. and Plotkin, A.: Low-Speed Aerodynamics, Cambridge University Press, (2001). This condition is generally known as the "Kutta condition." The viscous effects using various boundary layer approximations and modeling of phenomena such as laminar-to-turbulent transition are then superposed on the potential flow solution in an iterative manner to determine the resultant velocity and pressure field around the airfoil. The aerodynamic forces and moments generated by the airfoil are then obtained by integrating the pressure around the airfoil.

The procedure is repeated to obtain the aerodynamic characteristics at other flow conditions.

A number of computer programs and associated software have been developed using such methods. The differences between various programs may be generally attributed to the relative quality of the viscous modeling used to determine boundary layer characteristics. These design methods have been used to design airfoils with predictable aerodynamic characteristics within a certain range of Reynolds numbers at low angles of attack. However, errors in the computed performance are known to increase significantly in the presence of flow separation near stall and post-stall conditions. Further, the generally used methods fail to predict hysteresis when an airfoil undergoes pitching oscillations.

The most widely used methods for airfoil design and analysis start with a potential flow model and incorporate viscous effects in one of two ways: (1) Eppler's PROFILE (see Eppler, R.: Airfoil Design and Data, Springer-Verlag (Berlin), 1990); and (2) Drela's XFOIL airfoil analysis method (see Drela, M., and Giles, M. B.: ISES: A Two-Dimensional Viscous Aerodynamic Design and Analysis Code, AIAA Paper 87-0424, January 1987). In the original Eppler airfoil analysis method, the pressure distribution is first obtained with a potential flow model. This pressure distribution is used to compute viscous effects using boundary layer approximations and superimposed on the potential flow solution to account for changes in pressure distribution due to viscous effects. The aerodynamic coefficients are then computed from the resulting pressure distribution. An alternate approach used in Drela's XFOIL code attempts to interactively couple viscous effects with the potential flow solution. Most other methods follow similar basic concepts.

The potential flow method is based on solving the governing Laplace equation, which is a second-order linear partial differential equation. The flow direction ($\alpha$) in the free stream in relation to a reference axis is assumed known. It requires two independent boundary conditions to obtain, out of infinite possible combinations, one unique solution.

Two types of boundary conditions are generally considered. In the Neumann type conditions, zero-flow normal to a solid surface is specified. In the Dirichlet type conditions, the flow about a body is uniquely determined if the flow direction $\theta$ is completely known on the given profile surface. The flow direction $\theta$ is measured from the chord line direction, a convenient reference line fixed in airfoil. If $\theta_S$ is the value of $\theta$ on the airfoil surface, then if the leading edge stagnation point (LESP) S1 and the flow separation point (FSP) S2 are fixed in position on the airfoil surface, $\theta_S$ is completely known, and the flow direction at all points in the flow is fixed. In particular, $\theta_\infty$, the flow direction at $\infty$, is fixed, as the incidence $\alpha$ is the angle between the airfoil chord (reference line) and the stream direction at $\infty$, $\alpha = \theta_\infty$. Thus corresponding to each pair of locations S1, S2 there is a unique value of $\alpha$. The pressures over the airfoil are also uniquely determined, and therefore the lift L is fixed in value. Conversely, if L and alpha are prescribed the positions S1 and S2 will be uniquely determined. More generally we need to prescribe any pair of the quantities alpha, L, S1, S2 to obtain a unique Dirichlet flow (see Woods Reference).

In both cases, the problem is usually resolved by assuming Kutta condition at the trailing edge. The Kutta condition at the trailing edge simultaneously provides the basis for calculating the circulation generated by the lifting body. Such an approach has been known and used for over a century and has provided an excellent first approximation for the aerodynamic forces and moments generated by a lifting body (see Theodorsen, T. and Garrick, I. E.: General Potential Theory of Arbitrary Wing Sections. NACA TR 452 (1933)), when the lift coefficient varied almost linearly with $\alpha$. This approach gave poor results in the presence of extensive flow separation on the suction side of the airfoil upstream of the trailing edge at high α, near and beyond stall (see de Vargas, L. A. T., de Oliveira, P. H. I., de Freitas Pinto, R. L. U., Bortoulus, M. V., and e Souza, M. da Silva.: Comparison between modern procedures for aerodynamic calculation of subsonic airfoils for applications in light aircraft designs, Proc. of COBEM, 18th International Congress of Mechanical Engineering, November 2005, Ouro Preto, MG.).

The current methods suffer from a fundamental mathematical drawback: the leading-edge stagnation point obtained initially by imposing the Kutta condition at the trailing edge is not fully corrected in response to viscous corrections that are computed in an iterative manner. Since the potential flow model is governed by elliptic equations (see Jeffrey, A.: Applied Partial Differential Equations. An Introduction. Elsevier Science, (2002)), where the downstream conditions have an impact on the upstream flow conditions, the presence of flow separation has a direct impact on the location of the leading-edge stagnation point and vice versa. This in turn has a significant impact on the aerodynamic forces and moments generated by the airfoil. In the absence of extensive flow separation (e.g., at low angles of attack), the error introduced by assuming a fixed leading-edge stagnation point location is marginal and practically ignored both in experiments and computations. However, the error becomes significant at high angles of attack, especially near and beyond stall. As a result, these methods completely fail at and beyond stall when there is a real potential for generating high lift.

Thus the conventional potential flow model provides useful but restricted solutions due to viscous effects that manifest themselves in the boundary layer in the form of transition, turbulence, and flow separation. On the other hand, full Navier-Stokes (N-S) equations could be used to solve the problem numerically but they require tremendous computational resources and time. Even then, a degree of empiricism is required to model and predict transition, turbulence, and flow separation in solving N-S equations. Thus, strictly speaking, the N-S approach is semi-empirical in nature, though significantly more detailed and complex compared to the potential flow approach. In comparison, the potential flow approach is simpler and, with proper physics and accurate mathematical modeling, it is capable of providing valuable engineering solutions with minimal computing resources and time.

SUMMARY OF THE INVENTION

The methods and systems of the invention provide improved predictions for the aerodynamic performance of wing sections, optimization of wind designs based on aerodynamic performance requirements and constraints, and the capability to obtain aerodynamic performance estimates through measurements of flow bifurcation points and freestream angle-of-attack.

An illustrative aspect of the invention provides a method of calculating flow performance characteristics of a body immersed in a fluid under a set of fluid flow conditions. The method comprises providing a geometrical description of a surface of the body and determining the set of fluid flow conditions. The set of fluid flow conditions includes a combination selected from the combination set consisting of angle of attack and leading edge stagnation point location, angle of attack and flow separation point location, and leading edge stagnation point location and flow separation point location. The method further comprises calculating a velocity flow field for the body using a critical point potential flow methodology and calculating flow performance characteristics. The calculated flow performance characteristics include at least one of the set consisting of angle of attack, leading edge stagnation point location, flow separation point location, lift coefficient, drag coefficient and pressure coefficient distribution.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with the preferred embodiment, it will be understood that it is not intended to limit the invention to those embodiments. On the contrary, it is intended to cover all alternatives, modifications and equivalents that may be included within the spirit and scope of the invention as described.

An embodiment of the invention provides a method for predicting the performance of a wing section. Another embodiment provides a method for designing a wing section given performance requirements and constraints. Still another embodiment provides a method for measuring aerodynamic performance using flow bifurcation point measurements in conjunction with other sensor measurements.

Figure 1:
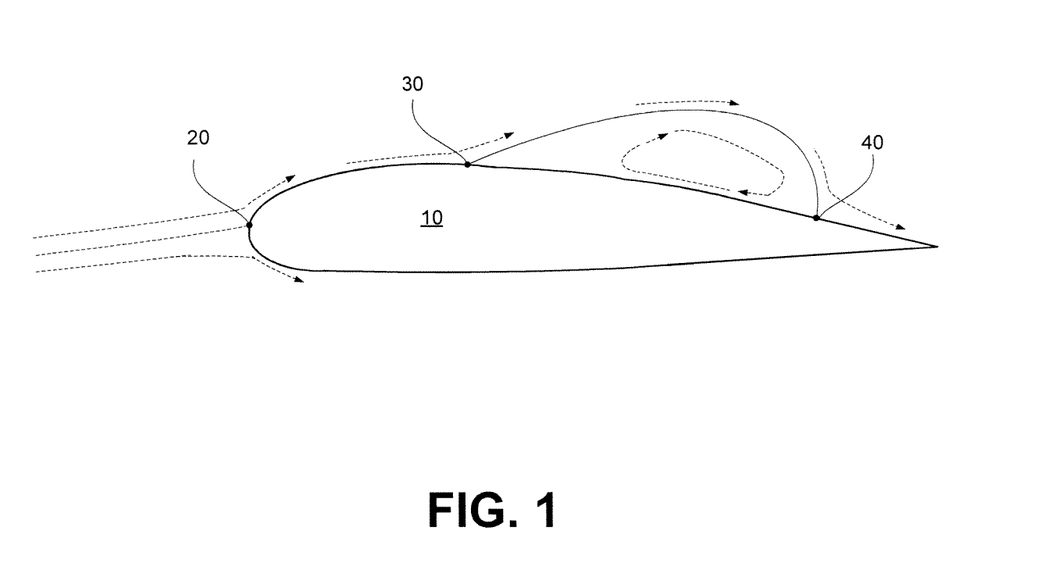
FIG. 1 is a schematic representation of the flow around a wing section.

As used herein, the term "flow bifurcation point" (FBP) means a location on a body surface where the flow attaches to or separates from the body. As shown in the idealized representation of FIG. 1, an airfoil 10 may have several FBPs including the leading edge stagnation point (LESP) 20, flow separation point (FSP) 30, and flow reattachment point 40.

When extensive flow separation region exists on the airfoil upper surface at high angles of attack and the Kutta condition is not satisfied at the trailing edge, it is necessary to formulate the problem differently by taking flow separation into account a priori. It can be mathematically shown that, according to the Dirichlet conditions for potential flow past airfoil, specifying any given pair of three boundary conditions (i.e., LESP, FSP, and angle of attack (a) at infinity) uniquely determines the third quantity (see Woods Reference). In such a case, the entire flow field is also simultaneously determined.

Thus, the LESP is uniquely determined for a given α and FSP. From the measurement point of view, flow separation location can be predicted if α and LESP are known. For steady flows, the lift and moment coefficients as well the pressure and velocity distributions around the airfoil are completely determined if any one pair of the aforementioned three quantities are known (see Woods Reference).

Of course, the FSP may not be known a priori. What are generally known are the direction of the free stream flow in relation to a reference line and the geometry of the airfoil section whose chord is taken as this reference line. It should be noted that for conventional approaches where the Kutta condition is applied and boundary layer effects are superimposed on the basic airfoil shape, this reference line loses its original meaning because the separated wake significantly alters the effective shape of the airfoil with α, and the definition of the chord line becomes vague.

The methods of the present invention use more realistic physical and mathematical modeling. In an embodiment of the invention, the mathematical model is based on potential flow theory combined with conformal transformation to describe the flow outside the separated flow region on a body such as an airfoil or wing. There are several important elements of this embodiment of the invention that will be discussed in the context of an airfoil immersed in a fluid.

First, the Kutta condition is imposed only on the lower (pressure side) of the airfoil while flow separation is allowed to occur upstream of the trailing edge on the upper surface. Second, assumptions based on free streamline theory are used to describe the wake downstream of flow separation from the upper and lower surfaces. Third, conformal transformation is used to determine the flow field with prescribed singularities at the leading edge, separation point, trailing edge and at infinity (wake). Fourth, the airfoil geometry is maintained as an invariant. The superposition of boundary layer thickness does not require any change in airfoil geometry for potential flow computations. The mathematical approach only requires the location of the FSP in order to determine the LESP for a given α. Finally, if both the LESP and FSP are specified (measured), α is automatically known. On the other hand, if α and LESP are specified, the FSP can be determined even without boundary layer calculations for a given airfoil geometry. More complicated cases of flow separation and reattachment, e.g., separation bubble, can be derived using potential flow and conformal mapping techniques providing similarly unique relationships for those cases.

Figure 2:
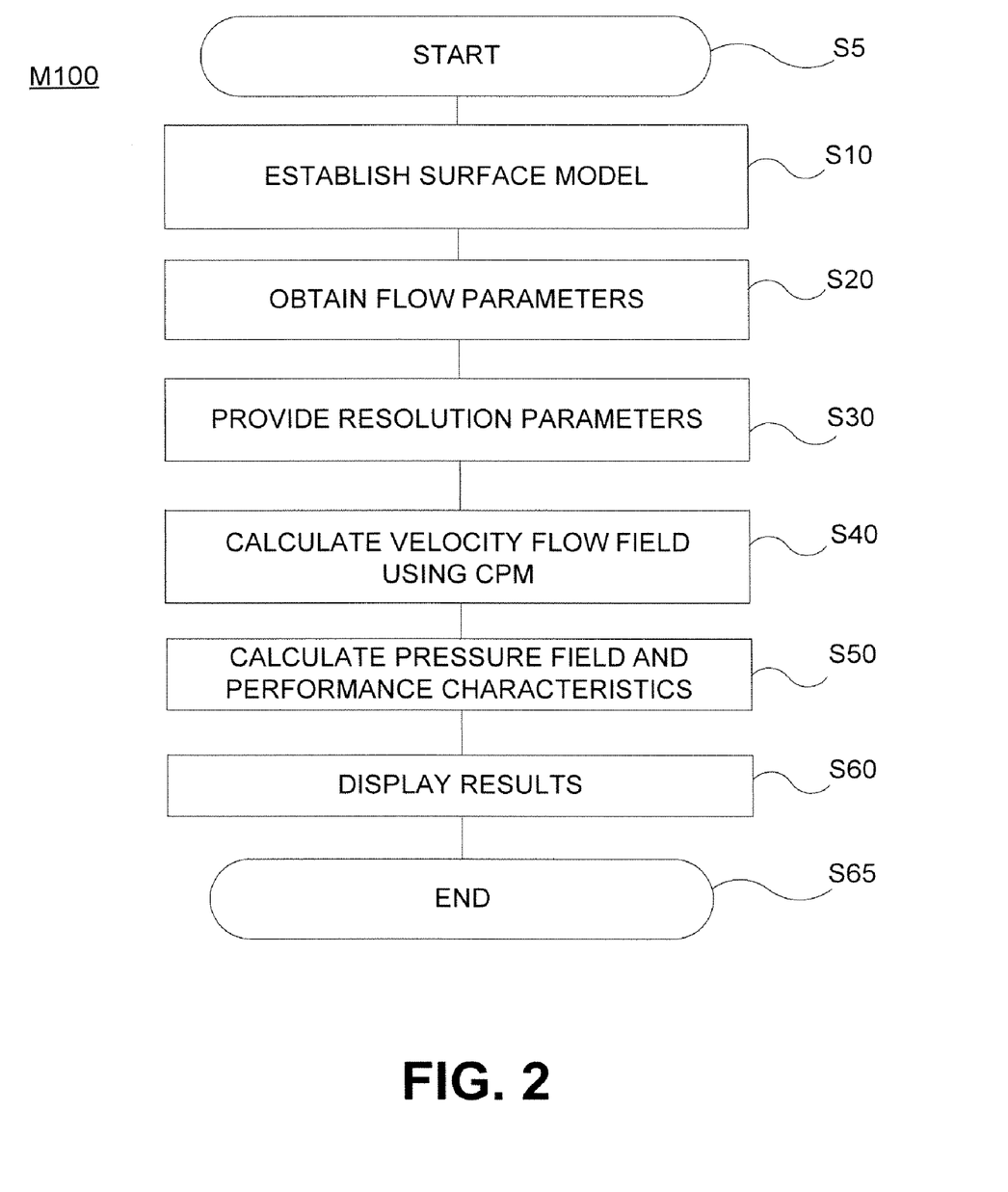
FIG. 2 is a flow diagram of a method for predicting flow performance according to an embodiment of the invention.

FIG. 2 illustrates a generalized method M100 for determining the flow and performance characteristics for an airfoil immersed in a fluid under a set of flow conditions. The method M100 begins at S5 and at S10 a surface model of the airfoil is established. The airfoil model is a mathematical representation of the airfoil surface. This model may be constructed by connecting line segments between points within a coordinate system. The airfoil can also be described using equations; e.g., equations for thickness as a function of chord line distance about a mean camber line. At S20, flow parameters are specified or otherwise obtained. The flow parameter input includes information such as freestream velocity, Reynolds numbers, kinematic viscosity, α, and related parameters. At S30, resolution parameters are provided or established. These parameters provide the spatial and numerical resolution for resolving the flow field and flow bifurcation points.

At S40, the input parameters and the surface model are used to calculate a velocity flow field. In the methods of the invention, this is accomplished using the Critical Point Method (CPM), which is described in more detail hereafter. At S50, the velocity field is used to obtain the pressure field and airfoil performance characteristics (e.g., lift and moment), which may be displayed at S60. The method M100 ends at S65.

Figure 3:
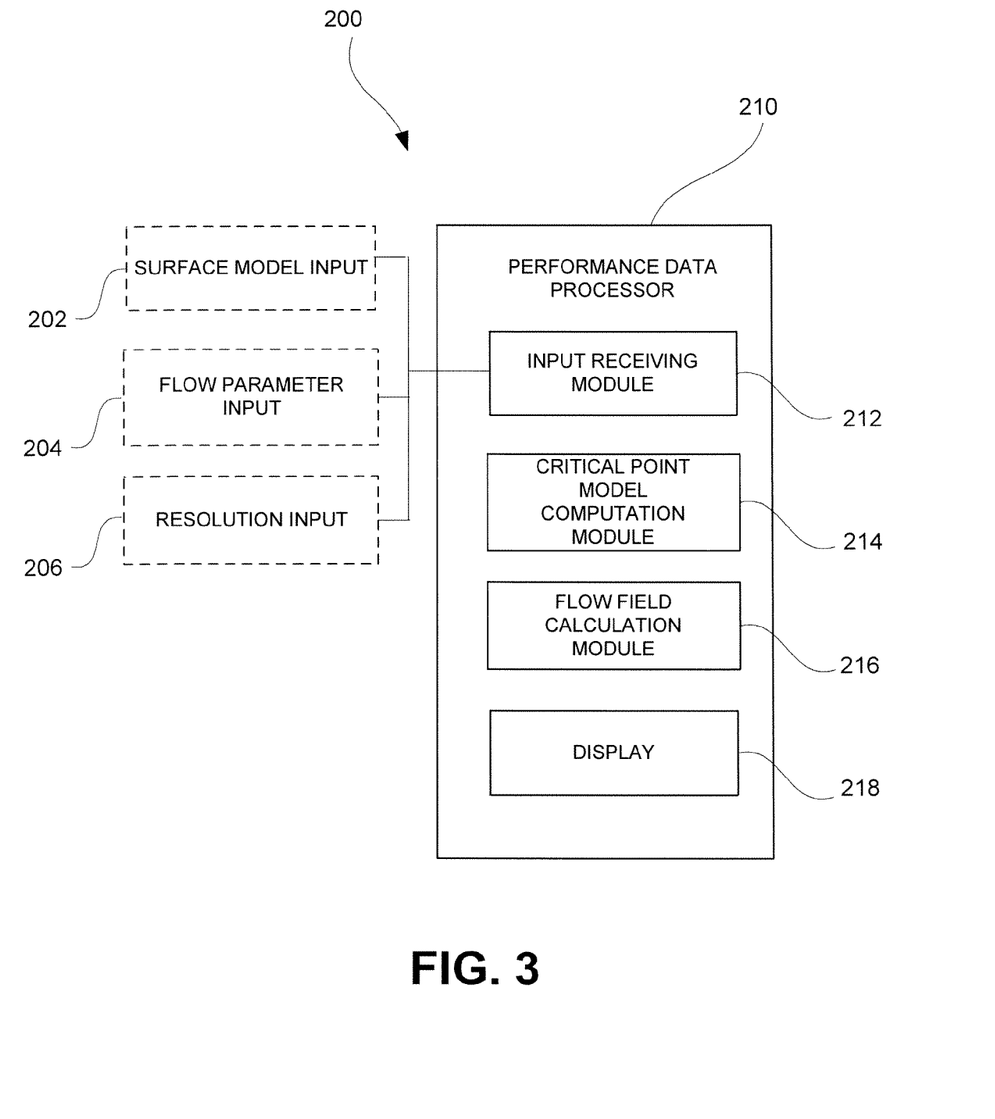
FIG. 3 is a block diagram of a system for carrying out methods according to embodiments of the invention.

FIG. 3 depicts an airfoil performance processing system 200 configured for implementing the general method M100 according to an embodiment of this invention. The system 200 includes a performance data processor 210 having an input receiving module 212, a critical point model computation module 214, and a flow field calculation module 216. There are three inputs: airfoil surface model input 202, flow parameter input 204, and resolution input 206. As discussed above, the airfoil model input is a mathematical representation of the surface that may be in the form of coordinate, connecting line segments between points, or mathematical equations. The flow parameter input may include freestream velocity, Reynolds numbers, kinematic viscosity, .alpha., and related parameters. The resolution input establishes the spatial and numerical resolution for resolving the flow field and flow bifurcation points. The input receiving module 212 may be a user interface or may be configured for receiving the various inputs from a database or other source. The critical point model computation module 214 uses the inputs received via the input receiving module 212 and processes the airfoil using the CPM and provides a calculated velocity flow field as a result with the prescribed numerical resolution. The calculated velocity flow field is consequently processed by the flow field calculation module 216 to obtain the pressure field and airfoil performance characteristics. The velocity/pressure profiles along with the FBPs may be displayed via a display 218 with the prescribed spatial resolution.

Figure 4:
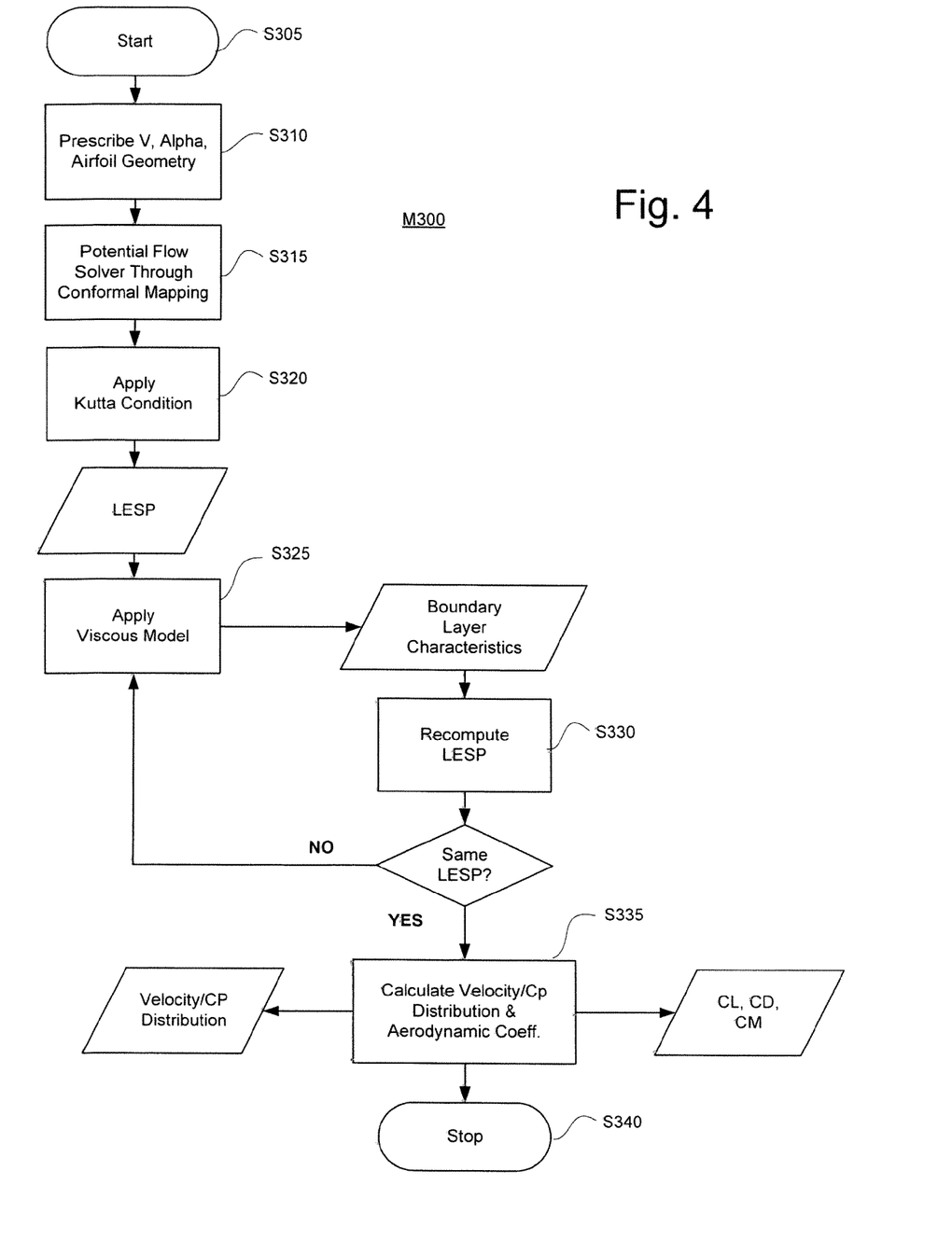
FIG. 4 is a flow diagram of a method for predicting flow performance according to an embodiment of the invention.

FIG. 4 depicts an embodiment of a CPM M300 for obtaining the aerodynamic characteristics of a wing section with a certain airfoil geometry and specified α. The CPM M300 begins at S305. At S310, the airfoil geometry is specified along with the velocity and angle of attack α, and at S315, a potential flow solver is established. At S320, the initial estimate for the LESP is obtained for the prescribed a by assuming a conventional Kutta condition at the trailing edge for the upper and lower surfaces. At S325 a viscous model is applied. For example, boundary layer methods exist in the art to predict flow separation as a function of the pressure gradient. Using a viscous model, boundary layer calculations are then computed for the resulting pressure distribution to obtain a new location for the trailing edge FSP on the upper surface. At S330, the LESP is then computed for the new FSP and α. Steps S325 and S330 are repeated until the LESP and FSP converge to within prescribed limits. When they have converged, the resulting velocity distribution, pressure distribution, aerodynamic lift/moment/drag coefficients are calculated at S335 using techniques known in the art. The method ends at S340.

The CPM method will now be described in more detail. We consider potential flow of incompressible fluid past an airfoil. The incident velocity vector is at angle alpha to the x-axis. The x-axis is aligned with the airfoil chord, with the leading edge taken as the origin of the coordinate system. We assume that the flow separates on the upper surface (suction side) of the airfoil (see FIG. 1). As a result of flow separation, a free streamline forms downstream of the separation point. We shall further assume that the pressure stays constant along the free streamline being equal to the free-stream pressure. We also assume that the flow separates at the trailing edge on the lower (pressure side) of the airfoil followed by a constant pressure free streamline. The pressure is also assumed to remain constant along this streamline at the free stream value.

The potential flow is described by Laplace equations for the velocity potential or stream function. The flow can also be represented by a single complex potential $w=\phi+i\psi$, where $\phi$ is the potential function and $\psi$ is the stream function, and $z=x+iy$, x-axis being oriented along the airfoil chord, with the LE as the origin of the coordinate system. With the flow parameters satisfying the Cauchy-Riemann conditions, the complex velocity potential is expressed as $$f(z)=dw/dz=u-iv$$

Here, u and v are the velocity components along the x and y-axes respectively:

$$u = \partial\phi/\partial x$$

$$v = \partial\phi/\partial y$$

The problem is solved in the complex plane using conformal mapping.

The function f(z) is analytic everywhere outside the airfoil except at certain singular points. The solution method generally revolves around how we treat the singularities at the leading edge stagnation point and the trailing edge separation. The leading edge (LE) singularity is usually taken care of by assuming the origin for the z-plane at the LESP. The trailing edge (TE) singularity is usually resolved by imposing zero velocity and requiring that the flow leave the TE smoothly. This condition is the well-known Kutta condition.

Theodorsen and Garrick described an exact method to solve this problem for arbitrary airfoil geometry through a series of transformations. There have been other similar methods based on conformal mapping to solve this problem. Kutta condition plays a pivotal role in all these approaches. While differing in the choice of mapping function and how they finally introduce viscous effects, they all share one common assumption: Kutta condition at the trailing edge. Flow separation is not prescribed in their potential flow formulation.

The methods of the present invention differ from these approaches and assume that flow separation occurs on the upper surface (suction side) at all positive incidences. The lower surface is treated exactly as in the conventional approaches, with the flow smoothly leaving the trailing edge.

The problem is solved by seeking a function f(z) that is analytic everywhere outside the airfoil surface and the separated flow region, and satisfies the (Dirichlet or Neumann) boundary conditions on the airfoil surface and constant pressure conditions along the separated streamlines. In the case of separated flow, there are four critical points (singularities) in the flow: the LESP of the airfoil, the FSP, trailing edge and the wake flow at infinity.

The complex function is evaluated in the neighborhood of each singularity. If necessary, an auxiliary function is chosen to deal with a particular singularity while maintaining continuity of the function. The Cauchy integral is evaluated throughout complex plane following standard techniques in complex variables. The integral is zero at all points except at the singularities where its value is given by the principal value of the integral or residues at each singularity.

The CPM is based on an analysis of the unknown complex potential function. The objective of the analysis is to determine all the critical points (zeros and singularities) in the flow region and correspondingly in the region of change of the parametric variable. There is a wide variety and flexibility of choices for selecting the region of change in parametric variable. The selection is made in such a manner that the behavior of the parameters in this region is well known. For example, the common types of such regions are circles, semi-circles, plane, half-plane, etc. The choice is generally dictated by the specific nature of the singularities in the problem.

Here we describe Kirchoff's method, which is a well-known example for the extreme case of flow separation from the leading edge of a flat plate. While the case of an airfoil with flow separation at arbitrary location is possible, we give this example mainly to describe the mathematical approach, which is common to both. We follow the approach described in Gurevich, M. I.: Theory of Jets in Ideal Fluids, Academic Press, NY and London (1965) ("Gurevich Reference").

It is assumed that the velocity V (and pressure, p) is constant along the free streamline. The flow downstream of the separation point on the upper and lower surfaces are assumed to be free streamlines. In lieu of determining the complex potential was a function of the complex variable z, it is possible to find the function:

$$\zeta(w) = dz/dw$$

If $\zeta(w)$ is found, then with a single integration, it is possible find z(w), since, $$Z = (1/V)\int V(dz/dw)dw = (1/V)\int \zeta(w)dw$$

It is then possible, in principle, to find w(z) by inverting z(w). This inversion process is cumbersome and difficult. Hence we revert to the problem of finding $\zeta(w)$. The geometric significance of this function lies in the fact that it gives a conformal transformation of the region of change of w onto the region of change of $\zeta$.

The complex potential is determined only up to an arbitrary constant C, where C is complex (C=Cr+iCi). The real part of the arbitrary constant Cr is chosen so that the velocity potential $\phi=0$ at the leading-edge stagnation point (a critical point), where the velocity is zero. The imaginary part of the arbitrary constant Ci is chosen so that the bifurcated streamline along the airfoil surface is represented by $\psi=0$. Thus the LESP is the origin for the w-plane. It can be easily shown that $\phi$ varies from $-\infty$ to 0 as the flow comes from infinity to the LESP, and changes from 0 to $\infty$ along the streamline to downstream infinity.

For every point in the z-plane there is a corresponding point in the w-plane. Also, for every point in the w-plane there is a corresponding point in the z-plane except those points on the real, positive semi-axis. This occurs because the stream function is zero ($\phi=0$) along both the dividing streamlines downstream of the LESP but the potential function ($\phi$) is different along these lines. This problem is usually resolved by making a branch cut along the positive semi-axis ($\psi=0$, $\phi>0$). The upper branch of this cut is used to describe the parameters on the upper surface and the lower branch is used for the lower surface. In doing so, it is critically important to pay attention to the changes in the argument $\theta$, of the complex functions. Here, $\theta$ is the angle between the velocity vector and the x-axis at a given point on the airfoil surface.

The behavior of the complex function in the flow region is used to determine a mapping function that correctly characterizes the critical regions. The conformal transformation of w onto $\zeta$ is found with the help of several successive mapping functions that satisfy all the boundary conditions and critical points to finally arrive at an explicit relationship between $\zeta$ and w. Because $\zeta(w)$ and therefore z(w) are known, it is not necessary to invert z(w). It is possible to use the direct relation between z and $\zeta$ as a function of w. Thus w provides the potential function ($\phi$) and stream function ($\psi$) in the entire region and in turn they provide the velocity field. Bernoulli's equation is used to obtain the pressure field. The aerodynamic coefficients are determined completely in terms of the flow parameters like density, free stream pressure, and free stream velocity for a given airfoil geometry.

The final result is expressed in the form of an integral equation that relates the LESP, FSP and alpha for a given airfoil geometry. This equation can be solved numerically to provide a unique functional relationship between alpha, LESP and FSP for a given airfoil geometry.

Once the LESP and the flow field (velocity and pressure distribution) are determined, it is possible to use boundary layer approximations to investigate the viscous effects. For example, the pressure distribution from the airfoil LESP can be used to compute transition region and separation location using standard techniques and compare with assumed separation location. The pressure distribution is used to compute aerodynamic coefficients. Aerodynamic coefficients can also be computed directly from the velocity potential function using the standard Blasius formula. See Gurevich Reference.

The methods of this invention differ from prior art in a number of important ways:

1. Flow separation point is included in the potential flow model
2. In the main embodiment of the invention, free streamline model is assumed for the wake; i.e., constant pressure is assumed along the separated streamline.
3. Airfoil geometry is not changed to account for the changes introduced by viscous effects. Instead, the flow field is first computed for the specified critical points (LESP, FSP) or alpha and resulting pressure distribution is used to compute the boundary layer characteristics. Three possibilities are addressed depending on the specified initial values:
   a. Only alpha is specified: When only alpha is specified, it is necessary to determine both the LESP and FSP. The Kutta condition is used as the initial guess for FSP at the TE. The pair of alpha and FSP is used to determine LESP location as well as the velocity and pressure distribution. The pressure distribution is then used to compute the boundary layer characteristics using standard models for predicting transition and flow separation locations. If the computed FSP location is different from the assumed TE location, the new LESP location is computed using the pair of alpha and FSP to solve the potential flow solver. The procedure is repeated till the FSP converges to a point with acceptable level of accuracy. The aerodynamic coefficients are computed for the resulting flow field.
   b. Alpha and LESP are specified: This case is relatively simple. These two values are inserted into the potential flow solver to obtain the aerodynamic coefficients.
   c. LESP and FSP are specified: This case too is relatively straightforward. The values of the LESP and FSP are inserted into the potential flow solver to obtain the aerodynamic coefficients.
   d. CL and alpha are specified: This case is similar to the Case a, above. LESP and FSP are obtained in an iterative manner. This problem arises when there is a need to generate a desired CL at a specified alpha. The program provides unique combinations of LESP and FSP for any CL (or alpha). The desired combinations could be established through effective flow control actuators or by morphing the airfoil geometry in an iterative manner.

Figure 5:
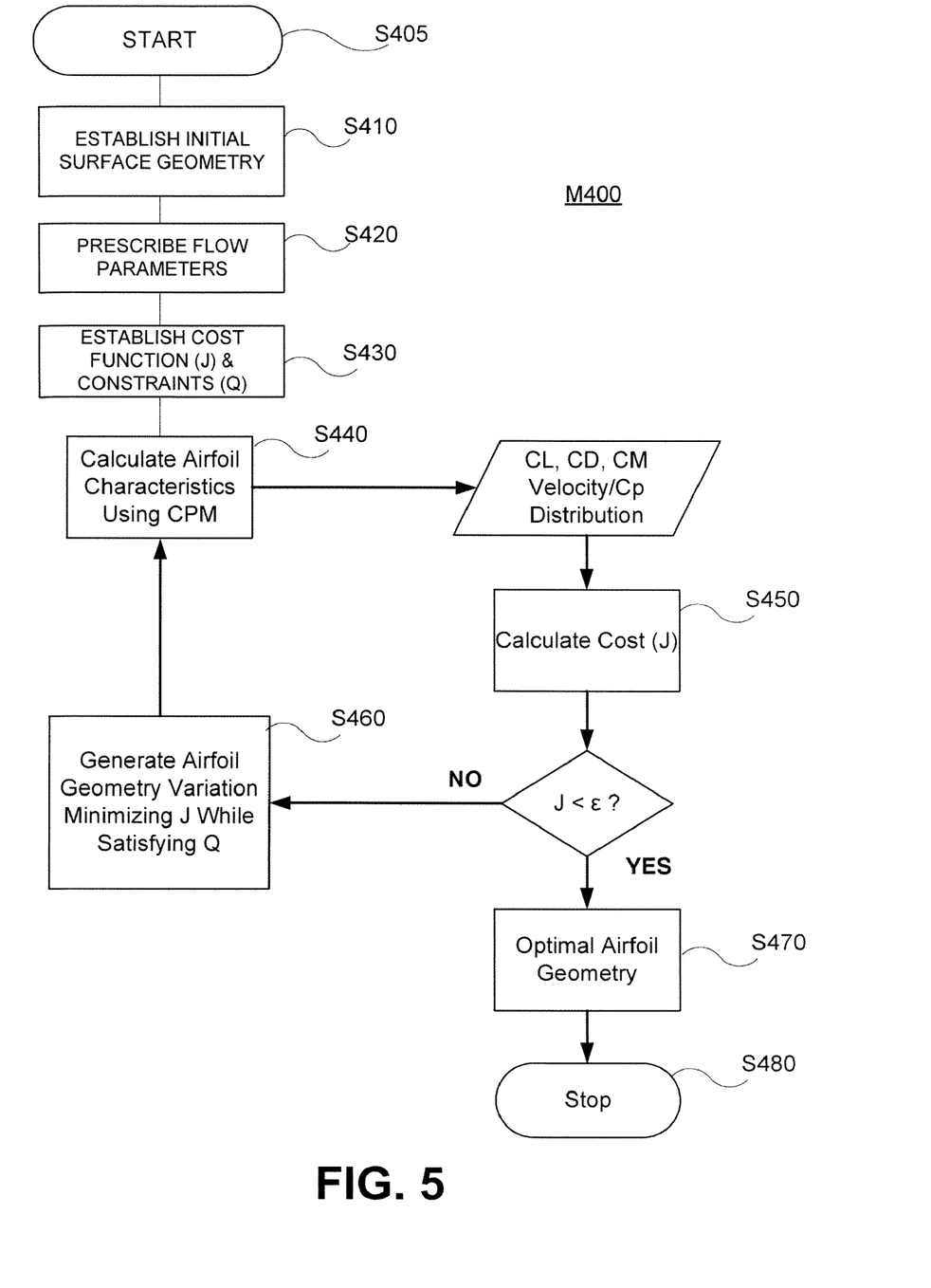
FIG. 5 is a block diagram of a method for optimizing an airfoil according to an embodiment of the invention.

FIG. 5 depicts a method M400 of designing wing sections using CPM. The method is based on standard aerodynamic design optimization methods; however, CPM is used in place of other computational methods to measure airfoil characteristics because of the improved accuracy and reduced computational burden. A description of the method M400 is as follows. The method M400 begins at S405. At S410, an initial airfoil surface geometry is provided, and at S420, one or more flow parameters (e.g., α, velocity) is/are specified. Airfoils are usually designed for a given range of α. At S430, a cost function is specified along with any constraints. The cost function is a performance metric that is supposed to be minimized (or maximized depending on the metric). For example, suppose we want to obtain a target pressure distribution, then the cost function is $$J = \frac{1}{2}\int_S (p - p_d)^2 \, ds$$

where S is over the airfoil surface, $p_d$ is the desired pressure, in which we desire to minimize J subject to any constraints, Q. Constraints may be provided in terms of fixed lift coefficient, airfoil thickness, curvature limits, etc. After prescribing the cost function J & constraints Q, providing the initial airfoil geometry, and flow parameter input such as freestream velocity, the method determines the optimal airfoil by iterating over variations of airfoils that satisfy the constraints. This process is started at S440 where the aforementioned CPM is used to calculate airfoil characteristics and the resulting flow field and performance characteristics (CL, CD, CM and $C_P$ distribution). At S450 a cost is computed using the cost function (J). When the cost function J is greater than a prescribed threshold $\epsilon$, the method generates at S460 a revised airfoil geometry within the specified constraints. Steps S440 and S450 are then repeated and a new cost function calculated. The optimal airfoil geometry is reached when the cost function J is below the prescribed threshold. The output at S470 is an optimal airfoil geometry provided in terms of line segments in non-dimensional x/c & y/c airfoil coordinates, where c is the chord length. The method ends at S480.

The method M400 may be carried out using a suitable processing system similar to that described in FIG. 3 but with the addition of a cost function module and an airfoil geometry generation module.

Figure 6:
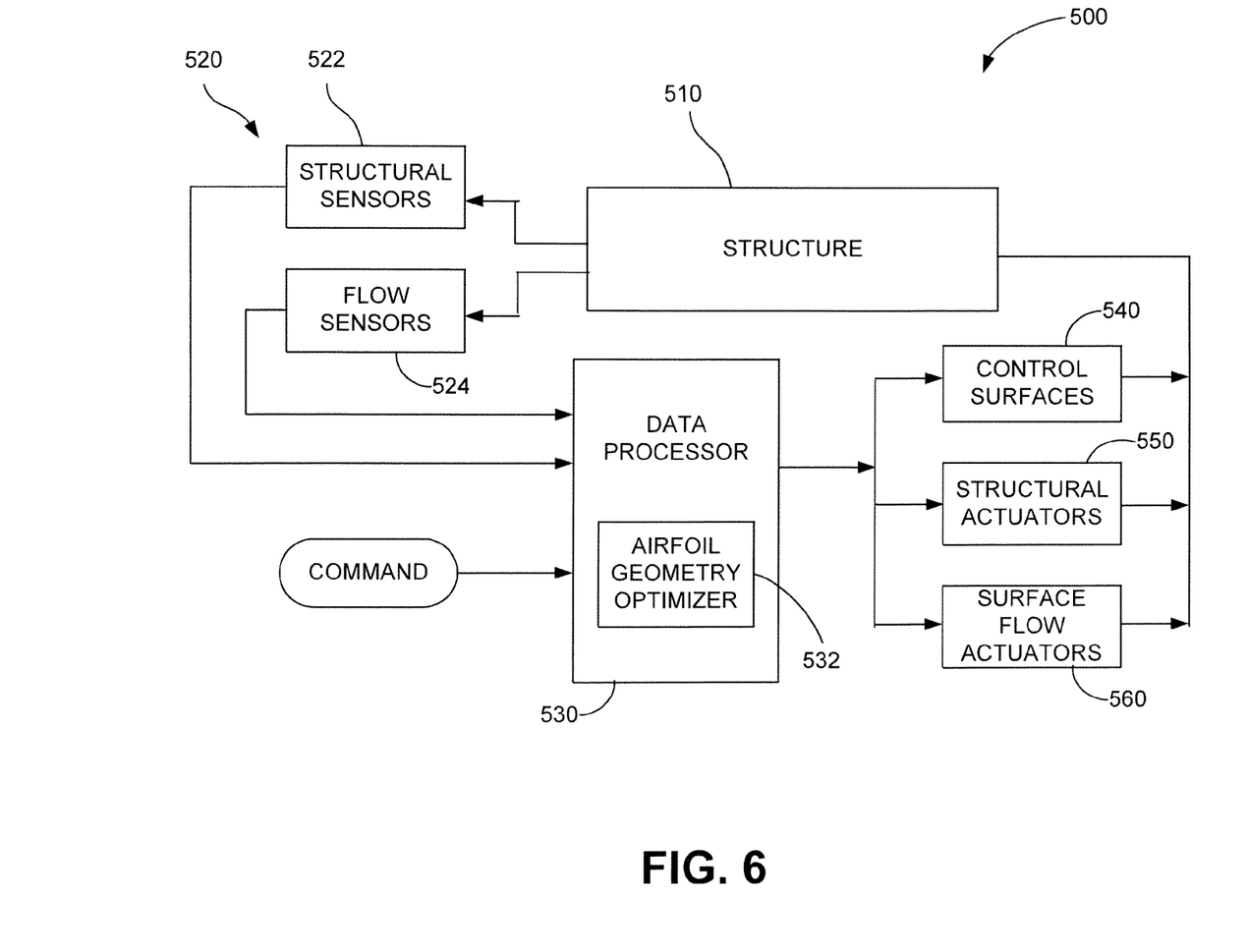
FIG. 6 is a block diagram of a control system according to an embodiment of the invention.

The block diagram in FIG. 6 illustrates a control system according to an embodiment of the invention that is similar to a control system described in U.S. patent application Ser. No. 12/117,010 ('010 application), which is incorporated herein by reference in its entirety. FIG. 4 of the '010 Application depicted a system 100 for controlling response to aeroelastic effects on a structure immersed in a fluid flow regime. Similar to the system of the '010 application, the system 500 of FIG. 6 of the present application includes a sensor array 520, which may include a set of flow sensors 524 and a set of structural sensors 522 applied to or incorporated into the structure 510. The flow sensor set 524 may include one or more FBP sensors such as hot-film sensors or "direct" shear sensors as described in the '010 application. The flow sensor set 524 may also include pressure sensors. The sensor array 520 may also include a set of structural sensors 522, which may include accelerometers and/or strain gages. The various flow sensors and structural sensors are disposed on and within the structure 510 to as to provide information sufficient to establish the flow and structural state of the structure 510.

The system 500 further includes a data processor 530 in communication with the sensor array 520. The data processor 530 is configured for receiving and processing data from the various sensors of the sensor array 520, for determining one or more actuator command signals, and for transmitting such actuator command signals to one or more aircraft actuators. The data processor 530 may also be configured to receive command inputs from a separate source (e.g., pilot input) for use in determining actuator command signals. The data processor is, accordingly, in communication with such aircraft actuators, which may include control surface actuators 540, structural actuators 550, and surface flow control actuators 560. Actuation of one or more of these actuators 540, 550, 560 results in a change to either or both of the flow state and the structural state of the structure 510.

As in the system of the '010 Application, the data processor 530 may be configured to process the sensor data in various ways including, but not limited to, one or more of the actions of summing, shaping, filtering, switching, gain scheduling, limiting, conditioning, and converting. The data processor 530 may be configured to operate as a neural network to facilitate sensor data and command signal processing.

The control system 500 extends the '010 application system to include an airfoil geometry optimizer 532 configured to carry out an optimization method based on the CPM and a cost function. Thus, the data processor 530 can determine, not just the conventional surface flow and structural actuation, but the actual geometry of wing sections that can be set using airfoil geometry actuators. Airfoil geometry actuators may include any number of wing morphing technologies known in the art, including, but not limited to, compliant structural actuation, scissor linkage mechanisms, or adaptable wing sails. The data processor 530 can but generally need not calculate the optimal airfoil geometry in real-time, as the airfoil may be pre-calculated and stored into a table. The data processor 530 can choose an optimal airfoil geometry based on the mission requirements and the current aeroelastic state.

The first step is to calculate the aerodynamic characteristics of the current iterated airfoil geometry. Using the aerodynamic characteristics, the cost function J is evaluated. If the cost function is within some prespecified threshold epsilon, then the cost function is considered minimized. In the case of the target pressure profile, the difference between the target and actual pressure profile will be reduced to within a threshold value. If the cost function J is above the threshold, then an airfoil geometry variation different from that of any previous iteration is generated. Ideally, the variation is generated such that the next iterate is closer to the global minimum. In any case, a variety of optimization methods may be used to generate the next variation including, but not limited to, gradient-based and evolutionary algorithms. The loop continues until the cost function is below the threshold, wherein the output is the optimal airfoil geometry.

Figure 7:
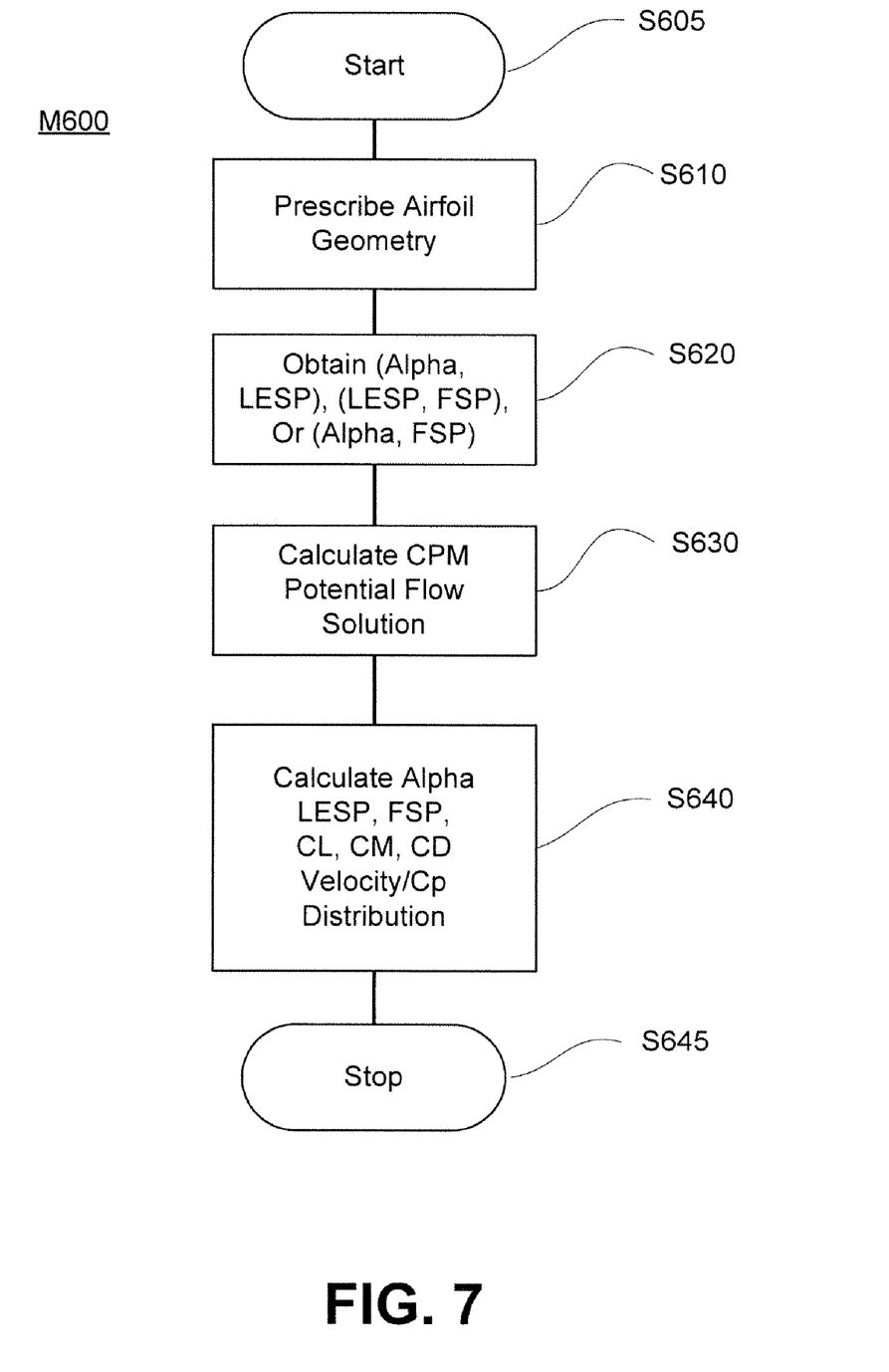
FIG. 7 is a flow diagram of a method for predicting flow performance according to an embodiment of the invention.

FIG. 7 depicts a method M600 of obtaining the aerodynamic characteristics of a wing section with a certain airfoil geometry given either α & LESP; LESP & FSP; or α & FSP as measurements. Given a prescribed airfoil geometry, two of the three parameters α, LESP or FSP are measured, and, using the potential flow solver through CPM, the aerodynamic characteristics of the airfoil geometry are obtained. The method M600 begins at S605 and at S610, the airfoil geometry is prescribed. At S620, a combination of two of the three flow parameters (α, LESP or FSP) are measured or calculated from other flow measurements. At S630, a potential flow solution is calculated using the CPM. At S640, the flow solution is used to calculate the aerodynamic characteristics of the airfoil geometry. The method ends at S645.

Although aerodynamic characteristics like CL and CM can be calculated from two of the three parameters in analytical/numerical form, for improved response time, the relationship may be stored in a pre-calculated table that is a function of the measured pair of parameters and airfoil geometries, e.g. LE/TE flap deflections. Other approximations including, but not limited to, neural networks, could be implemented to reduce the computational complexity of calculating the aerodynamic characteristics of the wing section. Even though the described potential flow model is not necessarily valid for unsteady flows, the instantaneous values of two of the three parameters could be used to calculate, as an initial guess, the instantaneous aerodynamic characteristics.

In addition, a state observer (e.g. a Kalman filter) could be implemented to obtain estimates of other flow parameters based on the estimates of these aforementioned flow parameters. As an example, in an aeroelastic system encountering gusts, α, LESP and FSP may be estimated through a combination of inertial/GPS, air data and flow measurements through the use of a observer to separate the effect of gusts, from the aeroelastic pitch/plunge, freestream angle-of-attack and unsteady aerodynamic effects. The output from the observer can then be used for determining the aeroelastic system state and as an output for a controller to optimize the aeroelastic system for aerodynamic performance, safety and ride quality, e.g., gust load alleviation.

Although the previous discussions have been primarily focused on two-dimensional flows, the invention can be extended to three-dimensional flows. As an example, sectional airfoil aerodynamic characteristics along the span may be calculated using the instantaneous, sectional LESP & FSP. Similarly, CPM may be extended to include chordwise and spanwise potential flows with defined attachment and separation lines instead of points. Specifically, the invention is applicable to three-dimensional flows for missiles and other projectiles in which the aerodynamic characteristics depend on the attachment and separation lines. In addition, an extension to the invention is the calculation of stability & control derivatives (derivatives of CL, CM, CD with respect to α, LESP and their respective time derivatives) from CL, CM, CD determined through CPM.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A computer implemented method of calculating flow performance characteristics of a body immersed in a fluid under a set of fluid flow conditions, the method comprising:
   providing a geometrical description of a surface of the body;
   determining the set of fluid flow conditions including angle of attack without either leading edge stagnation point location or flow separation point location; and
   calculating using a computer, a velocity flow field for the body using a critical point potential flow methodology; and
   calculating using the computer, flow performance characteristics including at least one of a set consisting of angle of attack, leading edge stagnation point location, flow separation point location, lift coefficient, drag coefficient and pressure coefficient distribution,
   wherein the action of calculating a velocity flow field includes:
   determining an estimated flow separation point location;
   determining an estimated leading edge stagnation point location based on the angle of attack and the estimated flow separation point location;

calculating an estimated pressure distribution;
determining an updated flow separation point location;
comparing the updated flow separation point location to the estimated flow separation point location;
responsive to a determination that the updated flow separation point location differs from the estimated flow separation point location point location by more than a predetermined level, revising the estimated leading edge stagnation point location based on the updated flow separation point location;
repeating the actions of calculating an estimated pressure distribution, determining an updated flow separation point location and comparing the updated flow separation point location to the estimated flow separation point location until the updated flow separation point location differs from the estimated flow separation point location by less than the predetermined level.

2. A system for determining flow performance characteristics of a body immersed in a fluid under a set of fluid flow conditions, the system comprising:
  a performance data processor including
    an input receiving module adapted for receiving a body surface geometry description, fluid flow parameters, and resolution input;
    a critical point model computation module in communication with the input receiving module, the critical point model computation module being adapted for using a critical point potential flow methodology to calculate a velocity flow field using the surface geometry description, the fluid flow parameters and the resolution input, and
    a flow field calculation module in communication with the critical point model computation module, the flow field calculation module being adapted for determining a pressure field around the body and flow characteristics for the body based on the velocity field, surface geometry description and fluid flow parameters,
  wherein the critical point model computation module is further adapted to calculate the velocity flow field based on fluid flow parameters that include angle of attack without either leading edge stagnation point location or flow separation point location by carrying out the actions of:
    determining an estimated flow separation point location;
    determining an estimated leading edge stagnation point location based on the angle of attack and the estimated flow separation point location;
    calculating an estimated pressure distribution;
    determining an updated flow separation point location;
    comparing the updated flow separation point location to the estimated flow separation point location;
    responsive to a determination that the updated flow separation point location differs from the estimated flow separation point location point location by more than a predetermined level, revising the estimated leading edge stagnation point location based on the updated flow separation point location;
    repeating the actions of calculating an estimated pressure distribution, determining an updated flow separation point location and comparing the updated flow separation point location to the estimated flow separation point location until the updated flow separation point location differs from the estimated flow separation point location by less than the predetermined level.

* * * * *

UNITED STATES PATENT AND TRADEMARK OFFICE
CERTIFICATE OF CORRECTION

PATENT NO. : 8,306,800 B2  
APPLICATION NO. : 12/499324  
DATED : November 6, 2012  
INVENTOR(S) : Siva M. Mangalam et al.

Page 1 of 1

It is certified that error appears in the above-identified patent and that said Letters Patent is hereby corrected as shown below:

In Claim 2, column 14, line 21, delete the second occurrence of the words "point location"

Signed and Sealed this
Nineteenth Day of February, 2013

Teresa Stanek Rea
*Acting Director of the United States Patent and Trademark Office*